United States Patent [19]
Arnold et al.

[11] 3,842,264
[45] *Oct. 15, 1974

[54] RADIOLOGICAL WELL LOGGING METHODS AND APPARATUS FOR REDUCING THE EFFECT OF ACTIVATION FROM THE DETECTOR CRYSTAL

[75] Inventors: Dan M. Arnold; Robert W. Pitts, Jr., both of Houston, Tex.

[73] Assignee: Texaco Inc., New York, N.Y.

[ * ] Notice: The portion of the term of this patent subsequent to May 15, 1990, has been disclaimed.

[22] Filed: Sept. 25, 1972

[21] Appl. No.: 291,869

Related U.S. Application Data

[63] Continuation-in-part of Ser. No. 102,743, Dec. 30, 1970, Pat. No. 3,733,486.

[52] U.S. Cl. ............................. 250/264, 250/269
[51] Int. Cl. ............................................. G01v 5/00
[58] Field of Search .......... 250/253, 256, 262, 264, 250/269

[56] References Cited
UNITED STATES PATENTS
3,733,486    5/1973    Arnold et al. .................. 250/71.5

Primary Examiner—Archie R. Borchelt
Attorney, Agent, or Firm—T. H. Whaley; C. G. Ries

[57] ABSTRACT

Improved radioactivity well logging methods and apparatus are provided for determining the macroscopic thermal neutron capture cross section of subsurface earth materials, wherein a correction is made to reduce or eliminate the effects of the portion of the measurement which is due to radiation produced by reactions of the residual fast neutron flux of the accelerator and the activation of the crystal in the detector. The high energy neutron source is pulsed at a preselected rate, during the first portion of the operating cycle, and the resulting capture-induced radiation is measured within the first portion of the operating cycle during two preselected time intervals following the termination of each neutron burst. Thereafter, the source is inactivated during the balance of the operating cycle, and a mesurement is made of the radiations registering in the activated crystal. This latter measurement is then utilized to correct the measurements obtained during the first portion of the operating cycle to a predetermined relationship.

7 Claims, 6 Drawing Figures

RADIOLOGICAL WELL LOGGING METHODS AND APPARATUS FOR REDUCING THE EFFECT OF ACTIVATION FROM THE DETECTOR CRYSTAL

This application is a continuation-in-part of application Ser. No. 102,743, filed Dec. 30, 1970 now U.S. Pat. No. 3,733,486.

BACKGROUND OF INVENTION

This invention relates to methods and apparatus for investigating the characteristics of subsurface earth materials and the like and, more particularly, relates to improved radioactivity well logging methods and apparatus employing a pulsed neutron source.

It is well known to make a log of the various earth formations traversed by a borehole by passing a source of high energy neutrons through the borehole to bombard the surrounding earth and by accompanying the neutron source with a radiation detector which is responsive to radiation resulting from such bombardment. More particularly, the logging system may include a sonde which is adapted to be suspended in the borehole at the end of a logging cable and means for paying out or reeling in the cable to pass the sonde longitudinally through the borehole.

The sonde is preferably composed of an elongated pressure-resistant housing containing the neutron source which is usually located adjacent one end and one or more radiation detectors spaced in the housing a preselected distance from the source. The detector is preferably adapted to generate electrical pulses corresponding to detected radiations, and these electrical pulses may be coupled to the cable for transmission to measuring and analytical equipment located at the surface of the earth.

Various types of neutron sources have been employed for well logging purposes, including encapsulated mixtures of radium and beryllium, plutonium and beryllium, actinium and lithium, etc., as well as the well-known "borehole accelerator" which is a static atmosphere device employing the deuterium-tritium reaction to generate 14.4 MeV. neutrons. Recently, however, the accelerator has proved to be especially desirable for well-logging purposes, since a neutron source of this type can be cyclically activated and inactivated to produce bursts or "pulses" of neutrons, and this permits certain especially useful measurements to be made as will hereinafter be explained.

Similarly, various types of radiation detectors have been employed for well-logging purposes, including ionization chambers, Geiger-Muller counters and scintillation counters. Techniques have been developed for alternately cycling a scintillation counter on and off at a high switching rate, and thus the scintillation counter has been preferred when a pulsed accelerator is to be used for these purposes.

When a neutron emanates from the source, it tends to travel in a straight line until it collides with an intervening nucleus, whereupon it may engage in one of several different types of reactions with the nucleus which has been struck. Certain types of these reactions will produce secondary or resultant radiations, and the type and energy of these secondary radiations may be a function of the type of nucleus and the energy of the impending neutron. Further, the bombarding neutron may experience a loss of energy and may be absorbed or "captured." On the other hand, the struck nucleus may be transformed to a different unstable state and may return to its original or a different state during a measurable time period which is a function or the kind of nucleus.

The probability that a particular type of nuclear reaction will occur depends upon the type of nucleus which is struck and upon the energy of the neutron at the instant of collision. Thus, a high energy neutron (one having an energy greater the 1 MeV.) is more likely to engage in elastic or inelastic scattering reactions with the various nuclei which are struck, whereas a "thermal" neutron (one having an energy of about 0.25 electron volts) will most likely engage in a capture reaction and be absorbed. On the other hand, certain types of nuclei tend to engage in certain kinds of nuclear reactions only when struck by neutrons traveling at greater than a certain velocity. For example, an oxygen-16 nucleus will only be transformed into an unstable nitrogen-16 nucleus when struck by a neutron traveling with energy greater than about 10.2 MeV. When such a reaction occurs, the nitrogen-16 nucleus will emit characteristic gamma radiation while returning to its stable state, and the energy of this gamma radiation can be measured for the purpose of identifying the occurrence of this particular reaction and the existence of this nucleus.

Neutrons are known to be highly penetrative, and thus a high-energy neutron generated by a borehole reactor may travel as much as several feet into the surrounding earth before engaging in one or more of the aforementioned different types of nuclear reactions. As hereinbefore stated, the likelihood that a neutron will engage in a particular reaction depends upon the character of the struck nucleus and not upon the density of the bombarded material. For example, hydrogen has a much larger "cross section" (probability) than iron, insofar as elastic scattering, inelastic scattering and capture reactions are concerned. Accordingly, the various fluids in the borehole will usually exercise a greater stopping effect on the "cloud" of neutrons emanating from the neutron source in the sonde than will the steel casing which lines the borehole.

As hereinbefore stated, certain of these nuclear reactions (in particular, inelastic scattering and neutron capture) will produce resultant gamma rays in number and initial energy which is characteristic of the struck nuclei. Thus, there will be a cloud of gamma rays in the vicinity of the sonde in the borehole, which will be coexistent with the cloud of neutrons hereinbefore discussed, and which will also tend to engage in one or more different kinds of nuclear reactions, i.e., the photoelectric effect, Compton scattering and pair production, also depending upon the character of the struck nuclei and the energy of the colliding gamma ray. The pair production reaction is a threshold-type reaction and is, therefore, of significance only insofar as high-energy gamma radiation is concerned. The photoelectric effect, on the other hand, is significant only when the gamma rays are of a relatively low energy. Accordingly, it is conventional in well logging to disregard the existence of these two types of reactions and to assume that the gamma rays resulting from the aforementioned neutron reactions will only engage in scattering reactions with the nuclei of the material surrounding the sonde.

When a gamma ray strikes a nucleus (and is scattered), it tends to lose energy and to be diverted along a different course. Thus, only a portion of the gamma rays which are generated within the earth materials surrounding the borehole will ever travel into the borehole proper. Moreover, only a portion of the gamma rays which actually enter the borehole will actually strike the radiationsensitive portion of the detector in the sonde. Also, it is the initial energy of a gamma ray which is a function of the character of the nucleus which was struck by the neutron, and this gamma ray may have engaged in many scattering reactions and lost a substantial portion of its initial energy before it reaches the detector in the sonde. Finally, and to further complicate the problem, some of the gamma rays which reach the detector were produced by radioactive material in the surrounding earth, and others may have originated in the neutron source (in the case of the encapsulated mixtures hereinbefore mentioned).

Notwithstanding these complications, techniques have been developed whereby a representative portion of the neutron-induced gamma radiation can be detected and whereby these detected gamma rays can be analyzed to provide a useful indication of the earth materials immediately surrounding the borehole. This is conventionally accomplished by the use of a scintillation counter as the detector, which is essentially composed of a gamma-responsive crystal and a photomultiplier tube optically coupled thereto. The crystal is preferred formed as a single translucent member or body, and for these purposes is thallium-activated and composed of an inorganic substance such as sodium iodide or cesium iodide, or the like, whereby each incident gamma ray which is absorbed in the crystal will generate a flash of light of an intensity proportional to the energy of the gamma ray. The function of the photomultiplier is to "see" these flashes and to generate a voltage pulse for each flash. Further, each voltage pulse is proportional in amplitude to the intensity of the flash which produced it, and thus the amplitudes of the pulses will be indicative of the energy of the gamma rays bombarding the crystal.

The train of pulses generated by the photomultiplier tube is conventionally processed by circuitry in the sonde which may include an amplifier to render the pulses usable and a discriminator to screen out low amplitude "noise" signals of no significance, and may thereafter be transmitted via the logging cable to pulse analyzing equipment at the surface of the earth. Accordingly, the number of pulses in each voltage range may be evaluated as an indication of the character and composition of the earth substances surrounding the borehole at various depths in the well.

As hereinbefore stated, the borehole accelator is often preferred over the encapsulated neutron sources for several reasons. For example, it produces only neutrons, whereas a radium-beryllium mixture produces around 5,000 gamma rays for each neutron being generated, and these gammas tend to confuse any measurement which is directed to neutron-induced gamma radiation. Second, the neutrons produced by an accelerator all have the same initial energy, which greatly simplifies the task of characterizing the resulting gamma radiation being detected and measured.

The principal advantage of the accelerator, however, is in the fact that it can be cyclically actuated to produce bursts of neutrons, rather than merely a constant output as is the case with the encapsulated sources. Moreover, techniques and apparatus are now available whereby the accelerator can be caused to be actuated to produce a discrete burst of neutrons during a precisely defined time interval (such as 20–30 microseconds) and to produce such bursts at a precisely controlled frequency such as once each 1,000 microseconds. In addition, circuitry is also now available whereby the scintillation counter can be selectively actuated and de-actuated during precise time segments during or following each actuation of the accelerator, and this has enabled the observation of various nuclear phenomena which could not previously be observed and interpreted.

In particular, logging methods are now performed wherein the accelerator is actuated for a period of 20–30 microseconds during each 1,000 microsecond cycle. Thus, a burst of high energy neutrons is generated in the borehole and adjacent earth immediately surrounding the sonde, and as these so-called "fast" neutrons engage in various nuclear reactions they tend to slow down until the population of fast neutrons is eventually replaced by (or transformed into) a population of thermal neutrons. Thereafter, this thermal neutron population will decline as the thermal neutrons individually engage in capture reactions with the various materials in and around the section of the borehole containing the sonde.

As hereinbefore stated, each capture of a neutron will usually be accomplished by the production of a gamma ray having an initial energy which is functionally related to the identity of the capturing nucleus. Thus, the existence of the thermal neutron population will tend to create a concomitant and corresponding capture gamma ray population having a "lifetime" which is substantially co-existent with the "lifetime" of the thermal neutron population.

It is well known that certain advantages are realized by detecting capture gamma ray populations rather than the thermal neutron populations. These advantages include (1) increased counting rates, and (2) more precise energy discrimination. It is, therefore, more desirable and convenient to detect capture gamma rays in order to measure the thermal neutron population which has produced them. As hereinbefore mentioned, hydrogen has a relatively large neutron inelastic and elastic scattering "cross-section." The various fluids within the borehole usually contain relatively large amounts of hydrogen and thus exercises a greater "slowing down" effect on the high energy neutrons emanating from the neutron source, than the material of earth formations adjacent the borehole. Accordingly, the high energy neutrons are "slowed" to thermal energies sooner and in a shorter distance in the borehole than in the adjacent formation.

As also hereinbefore mentioned, the probability that the nuclei of some elements will capture thermal neutrons is much greater than in the case of nuclei of other elements. In particular, this probability (hereinafter referred to as the capture "cross-section") is quite large for hydrogen and chlorine, especially in the case of thermal neutrons. Thus, it will be apparent that the portion of the thermal neutron population which occupies the borehole will tend to decline much faster than that portion which is in the surrounding earth, since the borehole is usually filled with well fluids which are composed to a substantial degree of hydrogen and chlorine. For this reason, it is now conventional to keep the detector de-actuated during an initial portion of the time period following the neutron burst from the accelerator and to actuate the detector to sense gamma radiations only after the neutrons in the borehole have at least substantially disappeared. Thus, the majority of gamma radiation which are detected may be assumed to have all originated out of capture reactions occurring only in the earth materials surrounding the borehole.

The duration or decay time ("lifetime") of the capture gamma radiation population is, of course, substantially coincident with the decay time of the thermal neutron population. The significant characteristic about the thermal neutron population is not its decay time as such, however, but is the rate at which the thermal neutron population decays away, since this decay rate is a direct function of the macroscopic capture cross section of the capturing earth materials. With conventional logging equipment wherein the neutron source can be selectively pulsed and wherein the detector can be cyclically actuated during discrete time intervals, as hereinbefore described, it is conventional to actuate the detector during two equal but separate detection intervals following each neutron burst. In this manner, the detected gamma rays may be counted during each of these intervals, and the rate of decay of the detected radiation may be determined as a direct function of the ratio of these two in order to evaluate the microscopic capture cross-section of the bombarded material.

The foregoing logging measurement is performed as a function of cable length in order to provide a correlative indication of borehole depth. Thus, the sonde is usually first lowered to the bottom of the well to achieve maximum cable stretch, and thereafter the sonde is lifted through the borehole at a preselected velocity while the accelerator bombards the adjacent earth with neutron bursts, and while the detector is actuated for two separate detection intervals (each usually 100–200 microseconds in duration) following each neutron burst. The pulses from the detector are fed continually to the surface equipment, where the aforementioned ratio is continually monitored and recorded as a function of depth to provide the log sought to be made.

Although the foregoing logging measurement has enjoyed widespread commercial acceptance throughout the oil and gas industry, it is subject to many problems which seriously limit its usefulness and general reliability. For example, it is desirable to space the detector as close as reasonably possible to the neutron source in order to increase the number of gamma rays being detected which are generated by neutron capture. On the other hand, if the detector is moved too close to the source in order to maximize the gamma ray counting rate, the detector crystal will then be subjected to a neutron flux of excessive intensity. This problem is especially prevalent when an accelerator-type neutron source is employed, because of the high initial energy (14.4 MeV.) of the neutrons, and because of the relatively high intensity of the source which is usually many times greater than that of any encapsulated neutron source which is safe enough to be handled by well logging personnel. Accordingly, this heavy bombardment of neutrons tends to "activate" the detector crystal, whereby the iodine-127 within the crystal is transformed into the unstable (radioactive) iodine-128 isotope. Thus, the crystal will not only scintillate in response to gamma radiation emanating from the adjacent earth materials, but it will also scintillate quite energetically from the radiation generated within the crystal itself. The photomultiplier tube cannot distinguish one scintillation from another, of course, and thus its output signal will be composed of pulses produced by the activation of the crystal as well as by the incident gamma radiation of interest.

In addition, accelerators currently used in well logging sondes can not be de-actuated completely during bursts of high energy neutrons. The resulting "residual" neutron flux consists of so called "fast" neutrons with a magnitude approximately 0.01 percent by the flux generated during the "accelerator actuated" cycle. These residual neutrons engage in previously discussed fast neutron reactions as they are slowed to thermal neutron energies. Radiations produced by these reactions, although 0.01 percent the intensity of such radiations produced while the accelerator is in the actuated cycle is considered as "background noise" and can adversely affect any reading made during the detector actuated/accelerator de-actuated cycle of the measurement. We have determined that this residual beam background can be as much as 50 percent of the signal generated in gate 2.

There have been many attempts made to eliminate these discrepancies from the measurement. For example, longer source-to-detector spacings have been tried. This has greatly reduced the count rate of the measurement, however, whereby small but significant changes in rate of decay of the thermal neutron population are often undetectable.

Attempts have been made to shield the detector by covering the crystal with boron or cadmium, or with some like material having a high thermal neutron capture cross section. The $I^{127}$ $(n,\gamma)$ $I^{128}$ reaction exhibits resonances well above thermal energy, however, and thus shielding alone cannot prevent the srystal from being activated.

In many cases, the activation and the effects of the residual neutron beam is simply ignored, since the component of the detector output signal which is attributable to crystal activation and residual neutron beam is relatively stable in magnitude. This is highly unsatisfactory at best, however, since these frequently constitute a relatively large part of the detector signal, and fluctuations in the resultant gamma portion of the signal which would be substantial if the gamma component could be viewed alone become quite small when added to the unwanted activation component.

In many other cases, the trigger level of the discriminator in the sonde is set to pass only pulses attributable to radiations of greater than the energy level of the unwanted activation radiations. This is quite undesirable, however, since iodine-128 emits beta radiation of 2.12 MeV. energy, and a substantial portion of the capture gammas sought to be detected will arrive at the detector with energies far lower than 2.12 MeV. Moreover, it frequently happens that a scintillation caused by a capture-reaction gamma will occur simultaneously with the scintillation produced by an activation-induced beta. Since the photomultiplier tube effectively "sees" only one scintillation at a time, it will generate a pulse having an amplitude which represents the sum of the intensities of these two (and sometimes more) flashes, and thus a pulse will pass the discriminator even though its amplitude is completely false from an interpretation standpoint.

These disadvantages of the prior art are overcome with the present invention, and novel methods and apparatus are provided for making a more accurate determination of the macroscopic capture cross section of the subsurface earth materials surrounding a borehole.

SUMMARY OF THE INVENTION

In a preferred embodiment of the present invention, a logging system is employed having a borehole accelerator actuated by a pulsing circuit and further having a scintillation counter adapted to be intermittently rendered responsive to incident capture gamma radiation. The accelerator is preferably actuated during the first portion of the operating cycle at a pulse rate of 1,000 pulses per second during the first 985 milliseconds of each second, and is held inactive during the balance of the operating cycle comprising the remaining 15 milliseconds of each second, however. In other words, during each one second of logging time the source is caused to generate a series of 985 neutron pulses at a pulse rate of one each millisecond, and then is held inactive or quiescent for a period of 15 milliseconds.

The scintillation counter is preferably coupled to a discriminator having a trigger level set at about 1.0 MeV. During the quiescent period immediately following each of the first 985 neutron bursts from the accelerator, the detector is preferably gated "on" for two separate but discrete equal detection intervals as hereinbefore described. After the last of the 985 bursts in each sequence occurs, however, the detector is preferably held inactive for a period sufficient for the thermal neutron population to substantially disappear. Then the detector may be gated "on" until the accelerator is again actuated to produce the first of the next series of 985 bursts, and during this extended "on" interval a radiation count is made which may be attributed entirely to activation of the crystal.

In certain cases, it may be desirable to set the discriminator trigger level as low as 0.1 MeV. Such a level will pass appreciable gamma activity resulting from (1) natural gamma radiation from the earth formation, and (2) gamma radiation produced by reactions of fast residual neutrons in the detector, other structural portions by the logging sonde, the bore hole, and the formation, and (3) gamma radiation resulting from neutron activation of other structural portions of the logging sonde, the borehole fluid, and unstable isotopes in the formations.

The detector gating circuit is preferably arranged to route the detector output to the surface by way of three separate channels, i.e., gate No. 1 will provide the pulses obtained during the first of each pair of detection intervals, gate No. 2 will provide the pulses obtained during the second of each pair of detection intervals, and gate No. 3 will provide the pulses obtained during each extended or 15 millisecond time interval. In the alternative, the pulses may be sent in groups to the surface by way of a common conductor, and gating circuitry at the surface may be used to separate and appropriately arrange the various pulse groups in synchronism with actuation pulses which are sent to the sonde to pulse the accelerator.

The counts or counting rates obtained from gates No. 1 and 2 will, as hereinbefore explained, be composed of pulses attributable both to the capture gamma rays sought to be detected, and to the radiations produced by fast residual beam neutrons and the activation of the crystal. The count rate provided by the signal from gate No. 3, however, includes substantially only the contribution made by residual neutron beam induced reactions and by the activation of the crystal, and thus the signal from gate No. 3 can be used to adjust or correct the signals from the other two gates. The adjustment to be made to the outputs of both the No. 1 and No. 2 gates may be stated according to the following relationship:

$$C' = C - [C_3 \cdot x/y] \cdot Z$$

wherein $C'$ is the adjusted count rate which is attributable to substantially only the capture gamma radiation, $C_3$ is the count rate provided by gate No. 3 and attributable to substantially only residual neutron beam induced reactions the activation of the crystal, $x$ is the detection time in milliseconds for the signal from the gate in question, $y$ is the detection time in milliseconds of the detection interval for the signal from the No. 3 gate, and $Z$ is the number of times the neutron source is pulsed during the irradiation portion of the one second operating cycle, and $C$ is the unadjusted count rate provided by the gate of interest and attributable to both the capture gamma radiation and to the activation of the crystal.

In a typical arrangement, the source is pulsed 985 times at a pulse rate of 1,000 pulses or burst per second and then is held inactive or quiescent for the remaining 15 milliseconds of each 1 second operating cycle. The detector is actuated during the first portion of the operating cycle (or the detector output siganl is passed) only during two equal 200 microsecond intervals, respectively, following each of the first 984 neutron bursts, and is then actuated again (or the detector output signal is again passed) during the last 10 milliseconds portion of the 1 second operating cycle. Accordingly, the adjustment to be made to the output signals from the No. 1 and No. 2 gates may be stated as follows:

$$C_1' = C_1 - [C_3 \cdot 0.2/10] \cdot 985$$
$$C_2' = C_2 - [C_3 \cdot 0.2/10] \cdot 985$$

wherein $C_1$ and $C_2$ are the unadjusted count rates from the No. 1 and No. 2 gates, respectively, and wherein $C_1'$ and $C_2'$ are the adjusted count rates corresponding thereto.

In a logging system which is especially suitable for purposes of the present invention, the circuitry located in the sonde may include an accelerator control circuit which is responsive to a timing pulse to actuate the accelerator according to the operating sequence hereinbefore described. Gating circuitry may also be provided in the sonde, which is also responsive to the timing pulse, and which is adapted to render the photomultiplier tube (or some other suitable portion of the detector) selectively responsive to incident radiation according to this same sequence. Alternatively, the detector circuitry may be continually energized, and the gating circuitry may be arranged and adapted instead to merely interrupt the detector signal during appropriate time intervals.

The surface equipment will preferably include a properly sequenced pulse generator for producing the timing pulses, and thus the timing pulses may be transmitted to the accelerator control circuitry and the detector gating circuitry by way of the logging cable. Other circuitry which is responsive to the timing pulses may also be provided at the surface to process and record the detector signals which are received from the logging cable.

It will be appreciated by those having skill in this art that the present invention will provide certain important advantages over the methods and apparatus of the prior art. In the first instance, it is a distinct advantage to lower the energy of detection by reducing the trigger level of the discriminator, since this permits a great many significant detector output pulses to be included in the measurement which were previously excluded. Not only does this feature of the present invention greatly improve the usefulness of the measurement insofar as its meaning is concerned, but the resulting increase in count rate will substantially increase the accuracy of the measurement by virtue of the corresponding reduction in statistical error. This, in turn, greatly improves the repeatability of the measurement sought to be obtained, which thereby increases the reliability of the measurement.

Previously it was necessary to pass the sonde through the borehole at a relatively slow logging speed because of the low count rate which is obtained when the discriminator is set at such an abnormally high level. Since the present invention permits the trigger level to be reduced, however, the resulting increase in count rate permits the borehole to be logged much more quickly, and this is always a distinct advantage from an economic standpoint.

These and other advantages and features of the present invention will become apparent from the following description of the present invention, wherein reference is made to the figures in the accompanying drawings.

DETAILED DESCRIPTION

Figure 1:
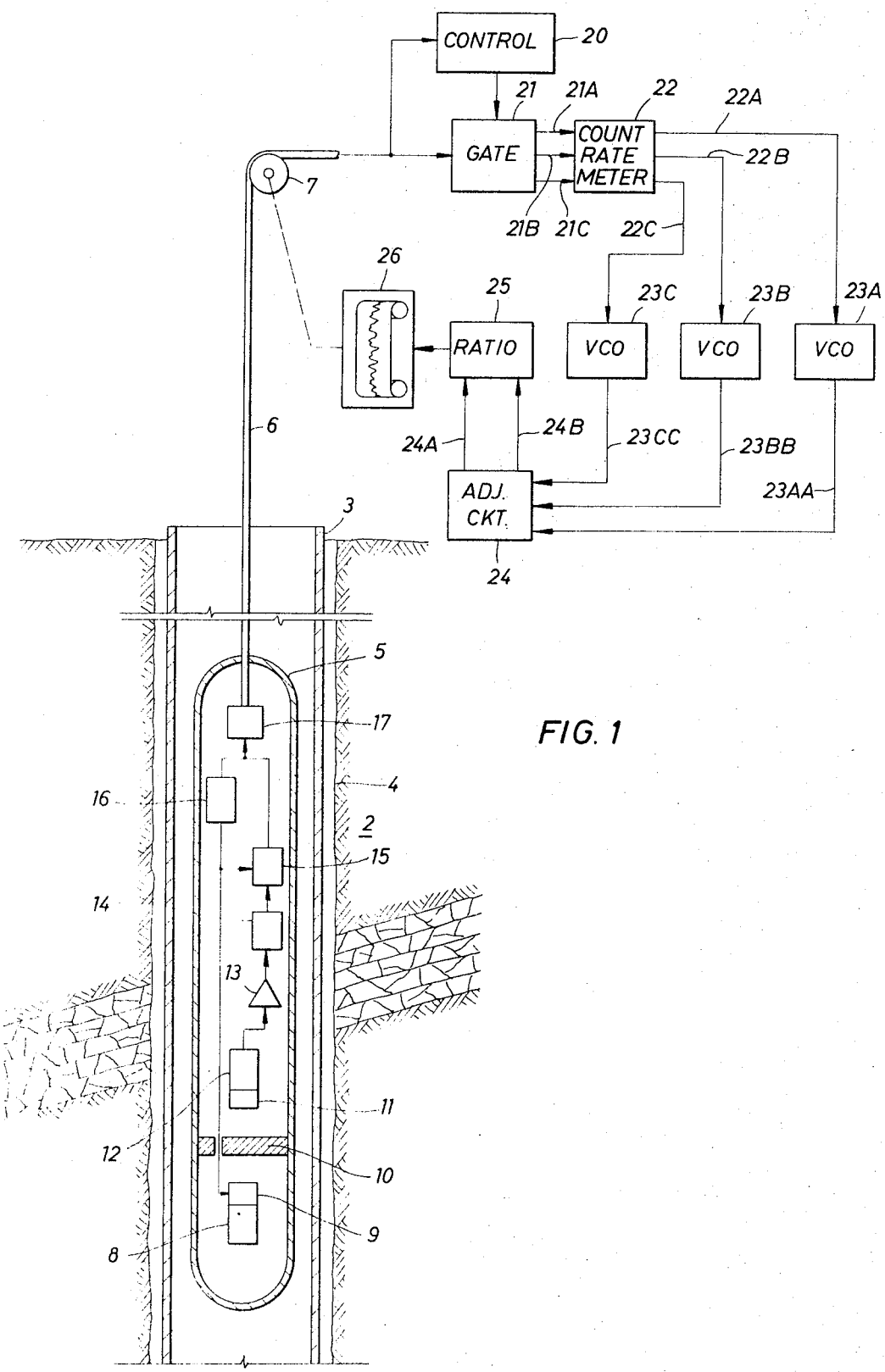
FIG. 1 is a simplified functional representation of the basic components of a well logging system incorporating the concept of the present invention.

Referring now to FIG. 1, there may be seen a simplified functional representation of one form of well logging system embodying the concept of the present invention and arranged to provide a measurement functionally related to the macroscopic thermal neutron capture cross section of the subsurface earth formations traversed by a borehole. In particular, there may be seen a typical borehole 4 penetrating the earth 2 and containing a conventional steel well casing 3. The logging system preferably includes a logging probe or sonde 5 or conventional design which may be suspended in the casing 3 at the lower end of a conventional logging cable 6.

As further depicted in FIG. 1, the hollow sonde 5 will contain a source of high energy neutrons in its lower end which, for purposes of the present invention, is preferably a static atmosphere ion accelerator 8 employing the well known deuterium-tritium reaction to produce a gamma-free flux of 14.4 MeV. neutrons. Further, a pulsing circuit 9 is preferably coupled electrically to the accelerator 8 for the purpose of causing the accelerator 8 to generate such neutrons in the form of bursts or pulses as hereinbefore stated.

As further indicated in FIG. 1, the sonde 5 is preferably provided with at least one radiation detector which is preferably adapted to indicate the energies of the detected radiations and which is, therefore, preferably a scintillation counter circuit composed of an inorganic thallium-activated crystal 11 formed of sodium iodide or the like, an end-window photomultiplier tube 12 optically coupled to the crystal 11, a suitable amplifier 13 coupled to receive the pulses generated by the photomultiplier tube 12, and an integral-type discriminator 14 coupled to receive amplifier pulses from the amplifier 13. As hereinbefore explained, the trigger level of the discriminator 14 is preferably set low enough to pass the maximum number of pulses generated by the photomultiplier tube 12 in response to incident radiations sensed by the crystal 11.

It will be understood that other logging systems may be employed in the practice of the present invention. For example, the amplifier 13 may be used to transmit pulses up the cable 6 to a surface signal processing network such as that disclosed in the copending U.S. Pat. application Ser. No. 82,028, filed Oct. 19, 1970, and gated in the manner described herein.

The crystal 11 is preferably spaced close enough to the accelerator 8 to sense a representative number of radiations entering the borehole 4 and casing 3 as a result of neutron bombardment of the portions of the earth 2 adjacent the accelerator 8. However, a suitable neutron shield 10 formed of cadmium, paraffin, iron, or copper or the like, is preferably interposed between the crystal 11 and accelerator 8 to prevent direct neutron bombardment of the crystal 11.

As hereinbefore explained, it is desirable for purposes of the present invention to derive a time dependent measurement of the radiations sensed by the crystal 12, and this may be accomplished in various ways, as by intermittently actuating and de-actuating the photomultiplier tube 12 or some other convenient portion of the scintillation counter circuit. As indicated in FIG. 1, however, a suitable gating circuit 15 may be included to interrupt the flow of output pulses from the discriminator 14 at suitable intervals, as will hereinafter be explained in detail. Such pulses as are passed by the gating circuit 15 may be applied to a suitable cable driving network 17 or the like for transmittal to the surface by way of the logging cable 6.

As will also be hereinafter explained, the gating circuit 15 is preferably arranged and adapted to gate the output of the discriminator 14 in synchronism with actuation of the accelerator 8. Accordingly, this synchronism may be accomplished by a suitable timing or control circuit 16, which is not only preferably connected to regulate both the gating network 15 and the pulsing circuit 9 by means of the same synchronizing pulses, but which is also preferably adapted to apply similar timing or synchronizing pulses to the cable 6 for regulating the signal processing and recording equipment located at the surface of the earth 2.

It is desirable that the measurement provided by the depicted logging system include a correlative indication of the depth at which the sonde 5 is located in the borehole 4. Such an indication may be provided by conventional casing collar locating circuitry (not depicted) which may also be suitable coupled to or located in the sonde 5. However, as indicated in FIG. 1, the cable 6 is preferably arranged to drive a conventional sheave or measuring wheel 7, which may be supported over the mouth of the borehole 4 by any conventional means (not depicted), and which is preferably coupled in a conventional manner to regulate the operation of the recorder 26.

Referring again to FIG. 1, there may be seen a simplified functional representation of surface equipment which is suitable for purposes of the present invention and which may be coupled to the upper end of the logging cable 6. As will hereinafter be explained in detail, the control circuit 16 in the sonde 5 operates to actuate the gating network 15 which, in turn, may be arranged to sequentially interrupt the output of the photomultiplier tube 12 to produce three different types of groups of pulses from the radiation detector, but all three types of pulse groups may be transmitted to the surface by way of a common lead in the cable 6, along with the synchronizing pulse which is also applied to the cable 6 by the control circuit 16. Alternatively, each group of pulses may be transmitted to the surface by way of separate signal channels (not depicted).

Accordingly, however, all signals which are delivered to the surface by the logging cable 6 may be applied to the input of a suitable gate or switching circuit 21 which, in turn, operates to route each pulse group into the appropriate one of three signal channels 21A–C according to command signals provided by a surface control network 20. The control network 20 may be any conventional type of actuating circuit, except that it preferably performs its switching function in response to the synchronizing pulses generated by the control circuit 16, in order that each pulse group from the gating circuit 21 may be routed in to the appropriate one of the three channels 21A–C.

As may further be seen, an appropriate count rate meter assembly 22 is preferably included which receives the pulses from channels 21A–C, and which generates output voltages 22A–C which are functionally representative of the rate of occurrence of each of the appropriate pulse groups. Each of these three voltages 22A–C are preferably converted into functionally related digital signals 23AA–CC, and this may be accomplished by any suitable means. For example, the three voltages 22A–C may be coupled to the gains of three voltage controlled oscillators 23A–C which will provide output frequencies functionally related thereto.

Irrespective of how the digital signals 23AA–CC may be provided, however, they are preferably applied to the inputs of an adjustment circuit 24 which is adapted to utilize the signal 23CC to correct signals 23AA and 23BB according to the relationships hereinbefore explained, and to provide these corrected signals as digital inputs 24A and 24B to a digital ratio-taking circuit 25 of conventional design which has its output coupled to a digital-type recorder 26. As hereinbefore stated, the recorder 26 is preferably connected to record the output of the ratio circuit 25 together with a correlative indication of the depth in the borehole 4 at which the corresponding signals were generated by the photomultiplier tube 12. This may be accomplished in any of several conventional ways, such as by driving the recorder 26 in correlation with rotation of the sheave wheel 7.

Figure 2:
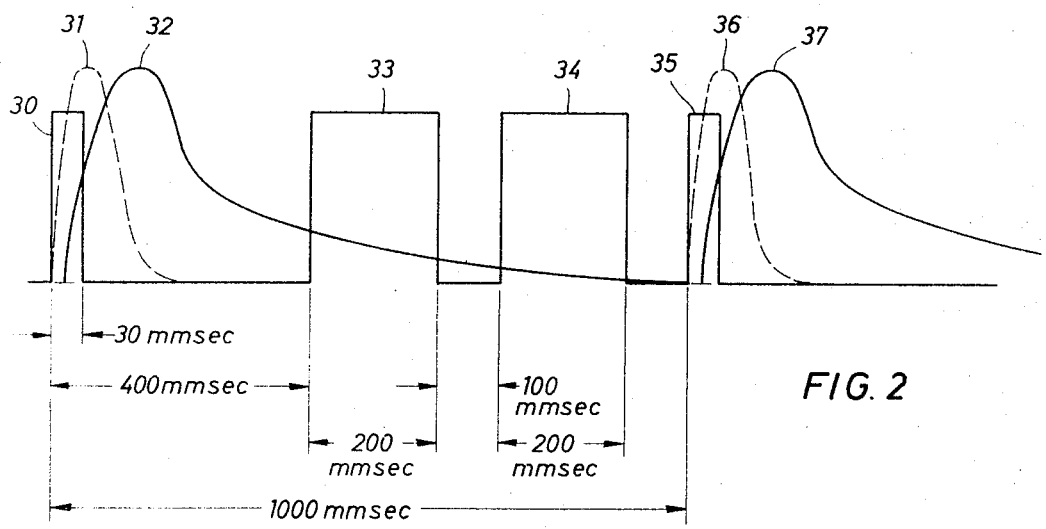
FIG. 2 is a simplified diagram representing the radiation generated by the neutron source during a representative portion of the operating cycle, and further indicating the detector gating sequence sought to be achieved during such portion of the cycle.

Referring now to FIG. 2, there may be seen a simplified functional representation of the relative forms of radiation which are produced by or as a result of the present invention and which are of interest. As hereinbefore stated, during each one-second cycle of operation the accelerator 8 is preferably repetitively actuated for a discrete time interval of suitable duration (such as 30 microseconds) at a frequency of one thousand pulses per second. Thus, the accelerator 8 may be turned on for the first 30 microseconds of each millisecond interval, but only during the first 985 milliseconds of each 1 second operating cycle.

As indicated in FIG. 2, each actuation period 30 of the accelerator 8 will produce a cloud or "population" of "fast neutrons" 31 (having energies greater than 1 MeV.) which permeate the borehole 4 and the regions of the earth 2 adjacent the accelerator 8 and the crystal 11. As is now well known, the fast neutron population 31 has a very short decay time, since the fast neutrons are very quickly slowed to thermal energy by the material which they permeate. Thus, the fast neutron population 31 which is created by the actuation 30 of the accelerator 8 is quickly replaced by a thermal neutron population 32.

As indicated in FIG. 2, the duration or "lifetime" of the thermal neutron population 32 may be expected to be much greater than the lifetime of the fast neutron population 31 from which it derived. However, it may also be expected to decay at least to negligible proportions by the end of the 1 millisecond interval which was initiated by the pulsation 30 of the accelerator 8 and which was effectively terminated by the next succeeding pulsation 35 of the accelerator 8. Thus, the thermal neutron population 32 may be expected not to be confused with the next successive pulsation 35 of the accelerator 8.

As hereinbefore explained, the radiation detector in the sonde 5 is preferably actuated for two discrete detection intervals following each of the first 984 pulsations of the accelerator 8 in each 1 second operating cycle, as the sonde 5 is lifted through the casing 3 and borehole 4 by the logging cable 6. The two detection intervals are preferably equal in duration and may continue for any suitable interval such as 200 microseconds each. As also hereinbefore explained, it is sought to investigate the character of the earth 2 surrounding the borehole 4, rather than the character of the fluids which are usually present in the casing 3, and thus the first detection interval 33 is preferably commenced at a time long enough following pulsation 30 of the accelerator 8 wherein all of the thermal neutrons in the casing 3 may all be expected to have been captured by these fluids.

The second detection interval 34 may preferably be initiated after an interval of "dead time" following termination of the first detection interval 33 and, as indicated in FIG. 2, this "dead time" interval may be 100 microseconds. The timing of the two detection intervals 33 and 34 are preferably selected so as to obtain a suitable number of counts whereby a representative indication of the decay rate of the thermal neutron population 32 may be determined.

Figure 3:
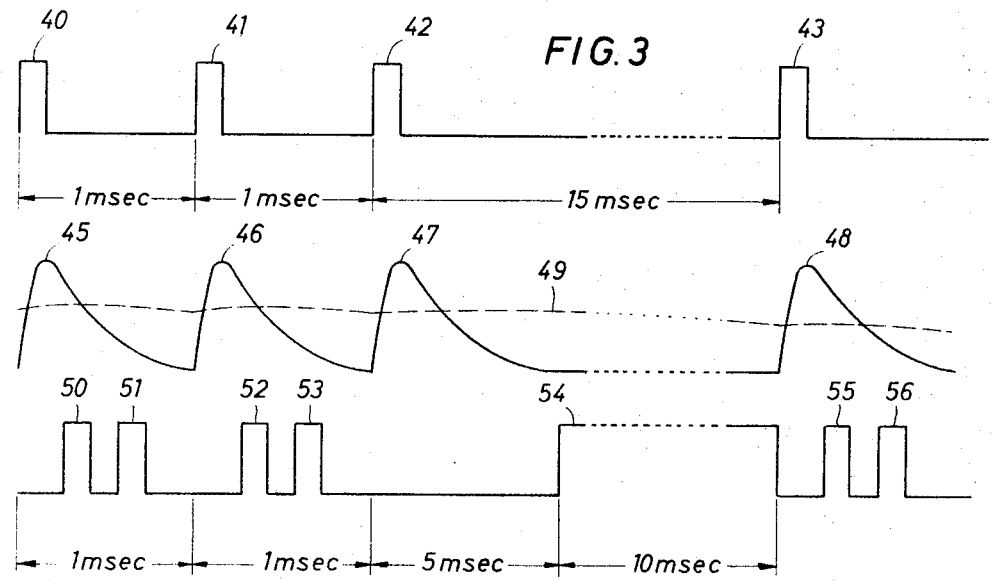
FIG. 3 is a similar diagram showing the sequence of source activation and detector gating during the latter portion of the operation cycle, and further showing the radiation sought to be detected during such latter portion of the cycle.

Referring now to FIG. 3, there may be seen a simplified diagram representing the nine hundred eighty-third, the nine hundred eighty-fourth and the nine hundred eighty-fifth pulsation 40–42 of the accelerator 8 during a particular 1 second operating cycle which terminates with the first pulsation 43 of the accelerator 8 during the next succeeding 1 second operating cycle. As further indicated in FIG. 3, each of these pulsations 40–43 will produce corresponding thermal neutron populations 45–48. The detector is actuated during intervals 50–51 and 52–53 to sample the nine hundred eighty-third and nine hundred eighty-fourth populations 45 and 46, respectively, and also during intervals 55–56 to sample the first thermal neutron population 48 in the next one second cycle of course. In the preferred embodiment of the present invention, however, the detector is held inactive for an extended time interval (for example, 5 milliseconds) following initiation of the last (the nine hundred eighty-fifth) pulsation 42 of the accelerator 8 during the 1 second operating cycle being considered. Thus, the thermal neutron population 47 created by this last pulsation 42 of the accelerator 8 may be expected to at least decay to negligible proportions (and preferably disappear entirely) before the detector is actuated for the final 10 milliseconds of the 1 second operating cycle.

As hereinbefore stated, the fast neutrons generated by the accelerator 8 tend to activate the crystal 11. In addition, the crystal 11 also tends to sense radiation produced as a result of the residual fast neutron beam. The sum of both types of these radiations tend to reach a constant level 49 as indicated in FIG. 3. Thus, the output pulses which are generated by the photomultiplier tube 12 during this final 10 millisecond detection interval 54 may be attributed solely to the activation of the crystal 11 and radiation produced as a result of the fast residual neutron beam.

Referring again to FIG. 1, the signals 21A and 21B may be considered to correspond to the pulses generated in the detection intervals corresponding to intervals 50–51, 52–53 and 55–56, respectively. However, signal 21C represents the pulses generated during the detection interval 54. Thus, during each 1 second operating cycle of the system depicted in FIG. 1, signals 21A and 21B will each be composed of a succession of 984 pulse groups corresponding to the radiation detected during each of the 984 pairs of detection intervals 33 and 34 represented in FIG. 2, and then followed by a single group pulse in signal 21C which is composed of the radiations detected during the ten millisecond detection interval 54.

Figure 4:
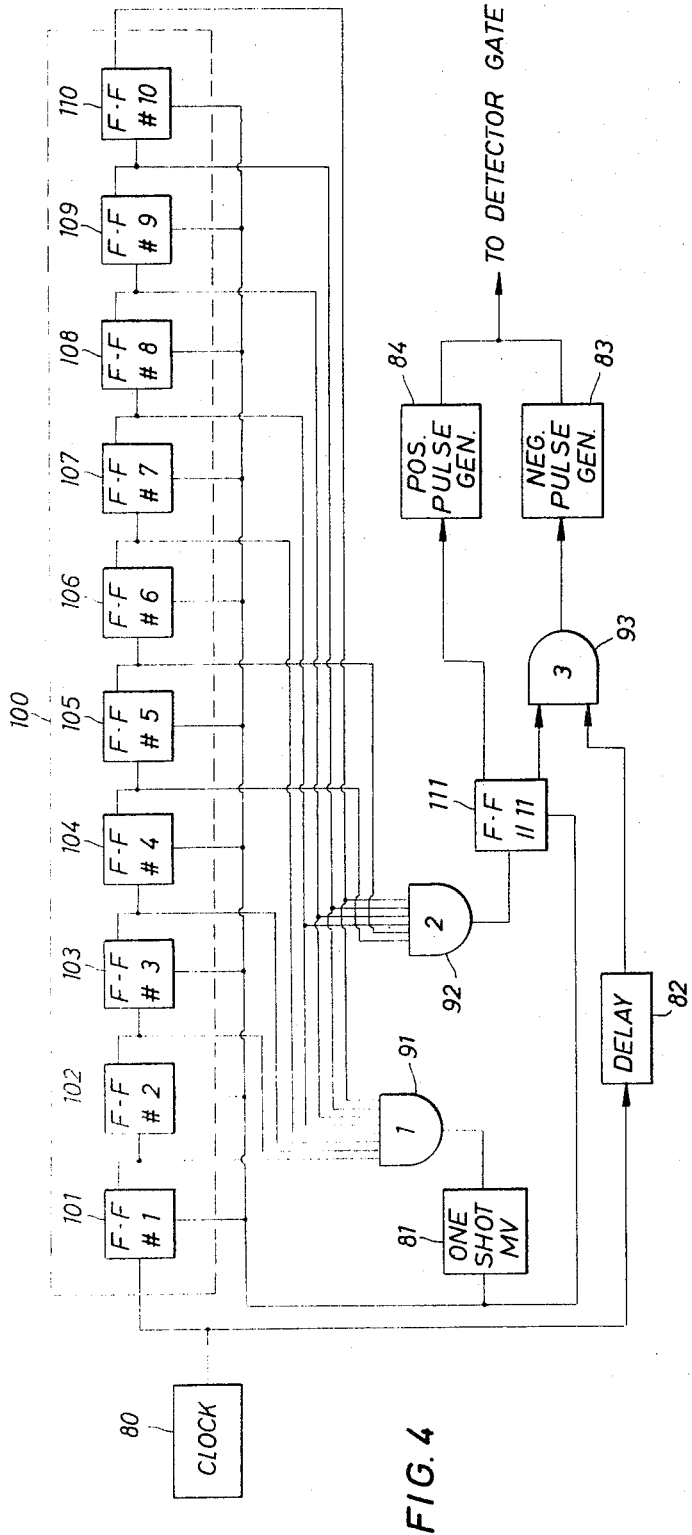
FIG. 4 is a simplified functional diagram of a portion of the apparatus depicted in FIG. 1.

Referring now to FIG. 4, there may be seen a simplified but more detailed representation of a portion of the major components of the control circuitry 16 depicted generally in FIG. 1. More particularly, an oscillator or "clock" circuit 80 is provided which generates actuating pulses at a frequency of 1000 per second, which is the frequency at which the accelerator 8 is to be pulsed by the pulsing circuit 9. These pulses from the clock 80 are coupled to the input of a counter 100 having 10 flip-flop circuits 101–110 of conventional design and also to the input of a suitable delay circuit 82 which is included to prevent "racing." Each pulse passed by the delay 82 is applied to an AND gate 93, or the like, which causes the negative pulse generator 83 to produce a negative switching pulse.

Figure 5:
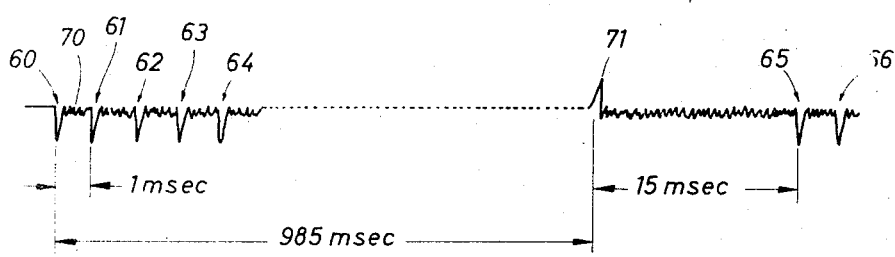
FIG. 5 is another simplified pulse diagram indicating the sequence of actuating pulses provided by the circuitry depicted generally in FIG. 4.

As indicated in FIG. 5, the circuitry depicted in FIG. 4 is arranged to generate a total of 984 of these negative switching pulses 60–64 (and others) during the first 984 milliseconds of each one second operating cycle, and thus each of these pulses 60–64 will occur at a frequency which is the frequency at which the accelerator 8 is sought to be pulsed, i.e., 1000 pulses per second. Accordingly, these negative switching pulses 60–64 are applied to the gating circuit 15 which is responsive to negative input pulses to produce a detector signal during the limited intervals 33 and 34 illustrated in FIG. 2.

When the nine hundred eighty-fourth clock pulse is received from the clock 80 by the counter 100, however, the gate 92 is opened to cause the flip-flop 111 to generate a coincident signal, which "closes" the gate 93 and which actuates positive pulse generator 84 instead. As indicated in FIG. 5, this will produce a single positive switching pulse 71 in lieu of the nine hundred eighty-fifth negative switch pulse which otherwise would appear at this time, and it is this positive switching pulse 71 which causes the detector gating circuit 15 to interrupt the output of the discriminator 14 for a preselected period of five milliseconds, as indicated in FIG. 3, and thereafter to pass the output of the discriminator 14 without further interruption for the remaining 10 milliseconds of the 1 second operating cycle under consideration.

The gate 93 will remain closed throughout this 15 millisecond interval, of course. When the counter 100 receives the 999th clock pulse of this sequence, however, all flip-flops 101–110 in the counter 100 will be reset, together with the other flip-flop 111, by a reset signal produced by the opening of the other gate 91 and the actuation of the one-shot multivibrator 81. This, in turn, causes the flip-flop 111 to discontinue its actuation signal to the positive pulse generator 84 and also to remove its blocking signal from the gate 93. Thereafter, the very next clock pulse will pass the delay circuit 82 and gate 93 to actuate the negative pulse generator 83, and this will produce first negative switching pulse 65 in the next succeeding one second operating cycle.

The negative switching pulses 60–66 may, of course, be employed to trigger the pulsing circuit 9 as well as to sequence the detector gating circuit. Accordingly, both the negative switching pulses 60–66 and the positive switching pulse 71 may be transmitted to the surface along with the data pulses 70 which are sought to be examined.

Figure 6:
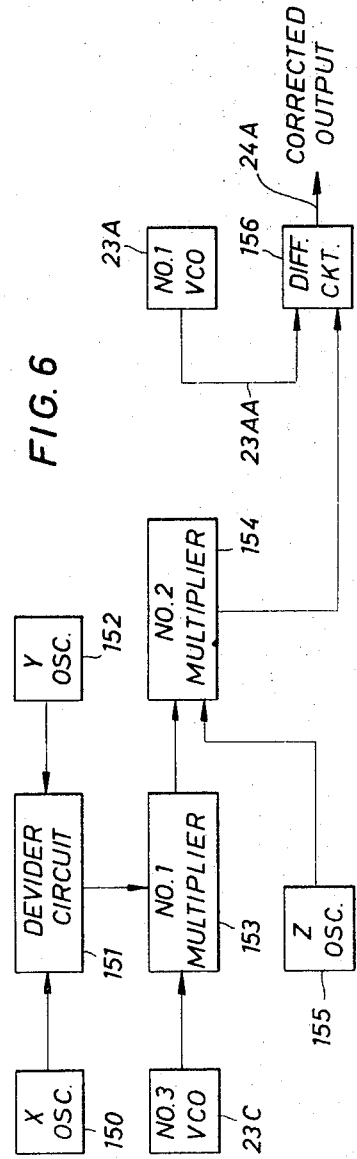
FIG. 6 is a simplified diagram representing the functioning of another portion of the apparatus depicted in FIG. 1.

Referring now to FIG. 6, there may be seen a simplified functional diagram illustrating the functioning of the adjustment circuit 24 depicted in FIG. 1. Accordingly, a first function oscillator 150 may be provided for generating a pulse train having a frequency which is functionally representative of the duration of the detection interval 53 indicated in FIG. 2, and a second function oscillator 152 may be provided for generating a pulse train having a frequency which is functionally representative of the duration of the latter detection interval 54 as indicated in FIG. 3. A conventional divider circuit 151 may be connected to provide an output pulse train which is a function of the quotient of the frequency from the first or "X" oscillator 150 divided by the frequency from the second or "Y" oscillator 152.

As hereinbefore stated, the count rate derived from the detector during the latter detection interval 54 is multiplied by the quotient signal provided by the ratio of the outputs from the X and Y oscillators 150 and 152. Accordingly, a conventional digital multiplier 153 may be connected to develop an output which is functionally representative of the product of the quotient signal from the divider 151 and the pulse train from the No. 3 voltage controlled oscillator 23C.

As further indicated in FIG. 6, a third function oscillator 155 is preferably provided for generating a frequency which is functionally representative of the number of times the accelerator 8 is pulsed during the irradiation portion of the 1 second operating cycle or, more particularly, that fraction of the operating cycle which is the irradiation period. Accordingly, a second multiplier 154 may be included to generate an output frequency which is functionally representative of the outputs from the "Z" oscillator 155 and the product signal from the first multiplier 153. Finally, the corrected signal which is one of the two signals 24A and 24B depicted in FIG. 1, will be the output of a conventional difference circuit 156 having one input connected to the output of the second multiplier 154 and having its other input connected to the output of either the No. 1 or No. 2 voltage controlled oscillators 23A or 23B.

As illustrated in FIG. 6, it is the corrected signal 24A which is sought to be obtained in this example, and thus the difference circuit 156 is necessarily coupled to receiver the output signal 23AA being provided by the No. 1 voltage controlled oscillator 23A. In one suitable embodiment of the circuitry, a conventional switch (not depicted) may be provided for appropriately selecting either the No. 1 oscillator 23A or the No. 2 oscillator 23B. Alternatively, a parallel arrangement for developing the other corrected signal 24B, which is substantially similar in function to the circuitry suggested in FIG. 6 but which will be interconnected instead with the No. 2 voltage controlled oscillator 23B, may be provided for the purpose of developing the corrected signal 24B.

It will be appreciated that the present invention is concerned with radioactivity well logging wherein a correction is made for radiation detected during a detection interval which is subsequent to the primary detection interval occurring during a first portion of an operating cycle following the emission of a pulse of neutrons for irradiating earth formations along a borehole. Radiation detected during the primary detection interval is primarily prompt radiation, such as neutron capture-gamma radiation, resulting from irradiation of the earth formation by the neutrons from the source, together with a lesser background component for which a correction is made by deriving a further signal responsive primarily to background radiation resulting within a component of the logging instrument. The correction is obtained by detecting radiation produced primarily within a component of the logging instrument either as a result of unstable isotopes produced in a component of the logging instrument, such as the radiation detector wherein an element of the detector crystal may be activated, or from prompt radiation produced during the subsequent detection interval by residual beam neutrons, i.e. neutrons resulting from the neutron source which are produced by neutron gamma reactions in components of the logging instrument because of the continuation of the neutron source at a lower level during "off" intervals between bursts, i.e. a residual beam produced within the neutron source generator whereby it is not completely reduced to zero during the detection interval and thereafter during the subsequent detection interval.

It is noted that heretofore it has been known to measure the background radiation emitted from earth formations external to the logging instrument to develop a background compensation signal. Such background radiation is of lesser importance than the radiation produced primarily within a component of the logging instrument itself. Heretofore, others did not recognize that the more important radiation is that produced primarily in a component of the logging instrument and it is that which is detected as the primary source of the signal derived to provide the correction in accordance with the present invention. For example, U.S. Pat. No. 3,510,655 discloses development of a background radiation resulting from prompt reactions of residual beam neutrons with earth formation outside the logging instrument. However, this patent does not disclose nor does it suggest the importance of the radiations produced within the logging instrument itself as a result of residual beam neutrons and which are of primary concern in accordance with the present invention.

In accordance with the present invention, it is contemplated that prompt background radiation produced within the earth formation adjacent to a borehole as a result of residual beam neutrons may also be detected in addition to the more important background radiation produced within a component of the logging instrument due to said residual beam neutrons.

Various other modifications may be made in the methods and apparatus hereinbefore discussed without significantly departing from the essential concept of the present invention. Accordingly, it should be clearly understood that the structures and techniques which are described herein and depicted in the accompanying drawings are illustrative only and are not intended as limits on the scope of the invention.

We claim:

1. A method of radioactivity well logging to investigate subsurface earth formations traversed by a borehole, comprising passing a logging instrument through said borehole, bombarding said formations with a plurality of discrete bursts of high energy neutrons emitted from said instrument during a preselected irradiation time interval occurring during a first portion of the operating cycle to produce a succession of discrete thermal neutron populations in said borehole and formations, detecting radiation at said instrument resulting from capture of said thermal neutron populations during preselected portions of said first portion of the operating cycle, after termination of the first portion of the operating cycle including said irradiation interval and after said thermal neutron populations in said formations have declined to negligible portions, detecting during a preselected subsequent detection time interval other radiations, produced primarily within a component of said logging instrument as a result of said high energy neutrons are emitted from unstable isotopes comprising material of the logging instrument, deriving a first electrical indication generally related to the occurrence of said resulting radiations detected during said first portion of the operating cycle, deriving a second electrical indication generally related to the occurrence of said radiations detected during said subsequent detection interval, and deriving from said first and second electrical indications a corrected representation of a characteristic of the earth material bombarded by said high energy neutrons.

2. A method of radioactivity well logging to investigate subsurface earth formations traversed by a borehole, comprising passing a logging instrument through said borehole, bombarding said formations with a plurality of discrete bursts of high energy neutrons emitted from said instrument during a preselected irradiation time interval occurring during a first portion of the operating cycle to produce a succession of discrete thermal neutron populations in said borehole and formations, detecting radiation at said instrument resulting from capture of said thermal neutron populations during preselected portions of said first portion of the operating cycle, after termination of the first portion of the operating cycle including said irradiation interval and after said thermal neutron populations in said formations have declined to negligible porportions, detecting during a preselected subsequent detection time interval other radiations resulting primarily within a component of said logging instrument as a result of said high energy neutrons which comprises radiation resulting from reactions of residual beam neutrons produced by the neutron source with material comprising at least one component of the logging instrument, deriving a first electrical indication generally related to the occurrence of said resulting radiations detected during said first portion of the operating cycle deriving a second electrical indication generally related to the occurrence of said radiations detected during said subsequent detection interval, and deriving from said first and second electrical indications a corrected representation of a characteristic of the earth material bombarded by said high energy neutrons.

3. A method of radioactivity well logging to investigate subsurface earth formations traversed by a borehole, comprising:

passing a logging instrument through said borehole, bombarding said formations with a discrete burst of high energy neutrons emitted from said instrument during a first portion of the operating cycle including a preselected irradiation time interval to produce a discrete thermal neutron population in said borehole and formations, during said first portion of the operating cycle detecting radiation at said instrument resulting from capture of at least said thermal neutron populations in said formations during preselected time intervals following said burst of high energy neutrons, after termination of said first portion of the operating cycle including said irradiation interval and after said thermal neutron populations have declined to negligible proportions, detecting during a preselected detection time interval other radiations produced primarily within a component of said logging instrument as a result of said high energy neutrons which comprises radiation resulting from reactions of residual beam neutrons from the source with material comprising at least one component of the logging instrument, deriving a first electrical indication generally related to the occurrence of said resulting radiations detecting during said first portion of said operating cycle, and deriving a second electrical indication generally related to the occurrence of said resulting radiations detected during the second portion of said operating cycle, and deriving from said first and second electrical indications a corrected representation of a characteristic of the material of the formations bombarded by said high energy neutrons.

4. A method of radioactivity well logging to investigate subsurface earth formations traversed by a borehole, comprising:

passing a logging instrument through said borehole, bombarding said formations with a discrete burst of high energy neutrons emitted from said instrument during a first portion of the operating cycle including a preselected irradiation time interval to produce a discrete thermal neutron population in said borehole and formations, during said first portion of the operating cycle detecting radiation at said instrument resulting from capture of at least said thermal neutron populations in said formations during preselected time intervals following said burst of high energy neutrons, after termination of said first portion of the operating cycle including said irradiation interval and after said thermal neutron populations have declined to negligible proportions, detecting during a preselected detection time interval other radiations produced primarily within a component of said logging instrument as a result of said high energy neutrons, which comprises radiation resulting from activation of material comprising at least one component of the logging instrument, deriving a first electrical indication generally related to the occurrence of said resulting radiations detected during said first portion of said operating cycle, and deriving a second electrical indication generally related to the occurrence of said resulting radiations detected during the second portion of said operating cycle, and deriving from said first and second electrical indications a corrected representation of a characteristic of the material of the formations bombarded by said high energy neutrons.

5. A method of radioactivity well logging to investigate subsurface earth formations traversed by a borehole, comprising:

passing a logging instrument through said borehole, bombarding said formations with a discrete burst of high energy neutrons emitted from said instrument during a first portion of the operating cycle including a preselected irradiation time interval to produce a discrete thermal neutron population in said borehole and formations, during said first portion of the operating cycle detecting radiation at said instrument resulting from capture of at least said thermal neutron populations in said formations during preselected time intervals following said burst of high energy neutrons, after termination of said first portion of the operating cycle including said irradiation interval and after said thermal neutron populations have declined to negligible proportions, detecting during a preselected detection time interval other radiations resulting from unstable isotopes produced primarily within a component of said logging instrument comprising material of the radiation detector and from reactions of residual beam neutrons from the source with at least one component of the logging instrument, deriving a first electrical indication generally related to the occurrence of said resulting radiations detected during said first portion of said operating cycle, and deriving a second electrical indication generally related to the occurrence of said resulting radiations detected during the second portion of said operating cycle, and deriving from said first and second electrical indications a corrected representation of a characteristic of the material of the formations bombarded by said high energy neutrons.

6. The method of claim 5 wherein further radiations resulting from reactions of residual beam neutrons with various elements within said earth formations are also detected along with said other radiations produced primarily within a component of said logging instrument.

7. A radioactivity well logging system comprising a subsurface logging instrument adapted to be passed through a borehole, a source of high energy neutrons arranged in said instrument for irradiating subsurface earth materials surrounding said borehole, wherein said source also produces residual beam neutrons which interact with material comprising at least one component of the logging instrument to produce radiation in said material of said logging instrument, a detector arranged in said instrument for detecting radiation from each formations adjacent the borehole as a result of irradiation thereof by neutrons from said source, said detector comprising as a component thereof material susceptible of being activated into an unstable radioisotope due to radiation emitted by said source, whereby radiation is emitted from said activated material of the detector, pulsing means for intermittently actuating said source to produce said neutrons in discrete bursts during a first portion of an operating cycle including a predetermined irradiation time interval, and means including said detector for selectively detecting radiation resulting from said irradiation of said earth formations at preselected time intervals during said first portion of said operating cycle and for selectively detecting radiation resulting primarily from activation of component material of said detector during a predetermined detection time interval occurring after substantial decay of said irradiating bursts of neutrons in said earth material and following the termination of said first portion of said operating cycle including said irradiation time interval, said selective detecting means includes means for detecting said radiation produced in a component of said logging instrument as a result of said beam current.

* * * * *